July 28, 1964  A. D. ROBINSON ET AL  3,142,606
APPARATUS FOR JOINING UNVULCANIZED RUBBER TUBES
Filed Dec. 14, 1961  3 Sheets-Sheet 1

INVENTORS
ALEC DENNIS ROBINSON
JOHN THOMAS STAINER
BY
Benj. T. Rauber
ATTORNEY

July 28, 1964 A. D. ROBINSON ET AL 3,142,606
APPARATUS FOR JOINING UNVULCANIZED RUBBER TUBES
Filed Dec. 14, 1961 3 Sheets-Sheet 2

INVENTORS
ALEC DENNIS ROBINSON
JOHN THOMAS STAINER
BY

*Benj. T. Rauber*

ATTORNEY

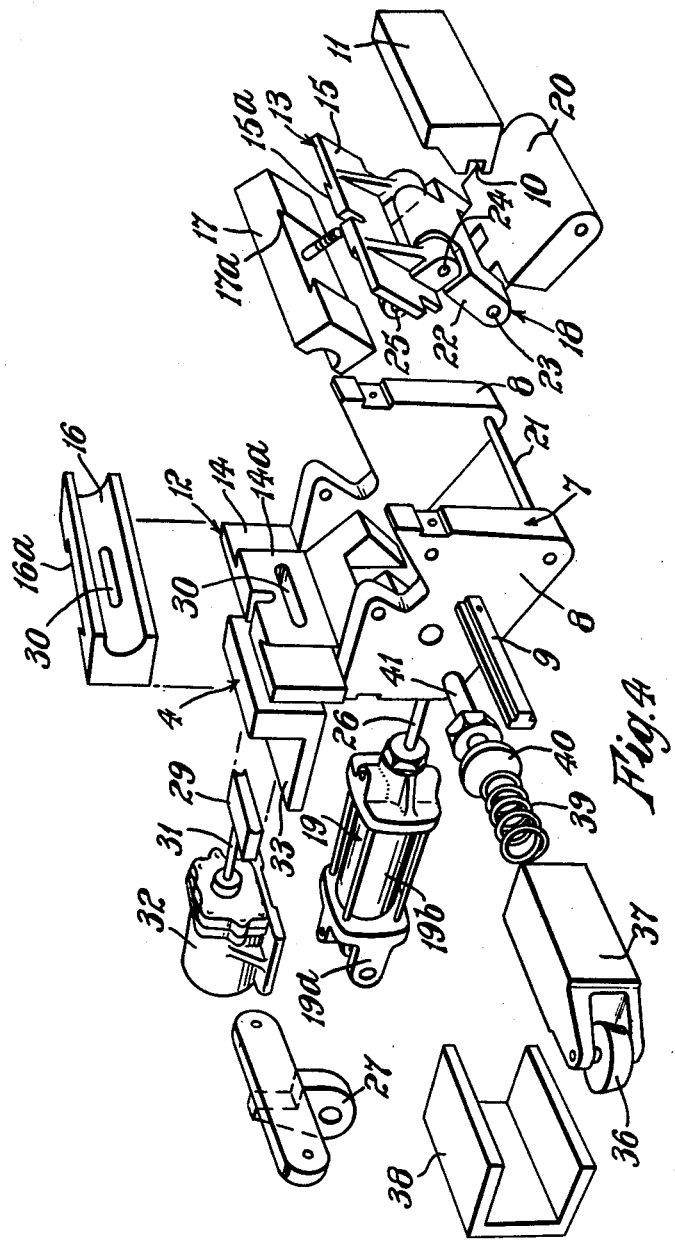

United States Patent Office 3,142,606
Patented July 28, 1964

3,142,606
APPARATUS FOR JOINING UNVULCANIZED
RUBBER TUBES
Alec Dennis Robinson, Birmingham, and John Thomas Stainer, Streetly, England, assignors to Dunlop Rubber Company Limited, London, England, a British company
Filed Dec. 14, 1961, Ser. No. 159,233
Claims priority, application Great Britain Dec. 23, 1960
17 Claims. (Cl. 156—503)

This invention relates to apparatus for joining unvulcanized rubber tubes.

In particular, the invention provides apparatus for producing a tube of toroidal form from an extruded length of unvulcanized rubber tube.

According to the invention, apparatus for joining together a pair of unvulcanized rubber tube ends comprises a pair of gripping members, one for each end, for gripping the outer surface of a rubber tube and supporting it in annular form considered cross-sectionally of the tube, the gripping members being disposed on a common axis and being movable towards and away from one another along the said axis, a support for the tube ends positioned between the gripping members and movable transversely with respect to the said axis, and a knife for each tube end movable transversely with respect to the said axis to sever a portion of said tube held in the support from a portion of said tube held in the associated gripping member.

The gripping members preferably each comprise a pair of tube-engaging portions mounted one on each jaw of a pair of jaws, means being provided for alternatively closing or opening the jaws to move the tube-engaging portions respectively towards and away from one another.

The pair of jaws are preferably mounted one pair on each of a pair of carriages which are movable towards and away from one another along a path parallel to the common axis of the gripping members.

Preferably, the tube-engaging portions each have a part-cylindrical surface for engaging and fitting closely to the outer surface of said tube, said gripping member having a complete cylindrical inner tube-engaging surface when said jaws are moved together.

The invention also includes a tube manufactured by apparatus as defined in any of the preceding paragraphs.

One embodiment of the invention will now be described, by way of example, with reference to the accompanying drawings, in which:

FIGURE 4 is a perspective exploded view of a gripping member and associated apparatus, forming part of the tube-joining apparatus.

Figure 1:
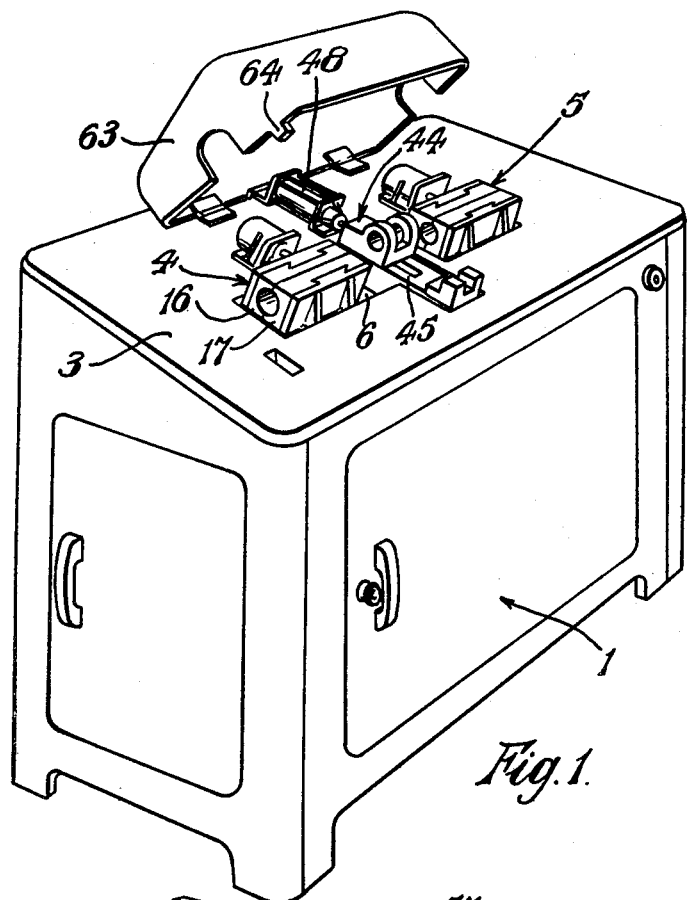
FIGURE 1 is a perspective view of a tube-joining apparatus in accordance with the invention.

A tube joining apparatus 1 for forming extruded lengths of unvulcanized rubber tube into toroidal shape, in the manufacture of curing bags for pneumatic tyres, is constructed as follows:

A machine framework 2 (see FIGURE 1) is provided with a flat work surface formed by a steel plate 3 attached to the framework. A pair of clamps 4 and 5 are mounted above a slot 6 extending across the surface, one on each of a pair of carriages 7 disposed beneath the slot (see FIGURES 2 and 4: only the carriage 7 associated with the clamp 4 is shown).

The carriages 7 are similar in all respects, and one carriage only will therefore be described. The carriage 7 comprises a body portion 8 to which a pair of horizontal rails 9 (only one of which is shown) is attached, one to each side of the body portion 8, the rails 9 being slidable in corresponding grooves 10 formed in a pair of steel blocks 11 (only one of which is shown) attached to the under surface of the steel plate 3, one block 11 being disposed on each side of the slot 6. The carriage 7 is thus slidable longitudinally with respect to the slot.

The clamp 4 comprises a pair of jaws 12 and 13 which are disposed above the level of the work surface, the jaw 12 being fixed to the body portion 8 of the carriage and the other jaw 13 being pivotally mounted on the body portion 8. The jaws 12 and 13 comprise, respectively, back plates 14 and 15 to which tube-engaging portions 16 and 17, respectively, may be detachably secured by the engagement of keys 14a, 15a formed respectively on the back plates 14 and 15 with dovetail keyways 16a, 17a formed respectively in the portions 16 and 17.

The tube-engaging portions 16 and 17 in the closed position of the clamp (see FIGURE 1) form a gripping member consisting of a hollow cylinder of internal diameter substantially equal to that of the unvulcanized rubber tube, and are interchangeable with a range of members of various sizes to suit corresponding tube diameters. The gripping members of the two clamps 4 and 5 are axially aligned with one another in the closed state of the jaws (see FIGURE 1), their common axis being horizontal and parallel to the slot 6. The pivotally mounted jaw 13 is movable towards or away from the fixed jaw by a toggle linkage 18 which is operable by a double-acting pneumatic cylinder and piston 19. The toggle linkage 18 comprises a first link 20 pivotally attached to the carriage 7 by a pin 21 and a second link 22 pivotally attached to the link 20 by a pin 23 and to the jaw 13 by a pin 24. The jaw 13 is attached to the carriage 7 by a pivot pin 25, and is movable about the pin 25 towards or away from the fixed jaw 12 by pivotal movement of the links 20 and 22 under the control of the piston and cylinder 19, which is connected via its connecting rod 26 to the pin 23. The end 19a of the cylinder 19b of the piston and cylinder 19 is pivotally attached to a block 27 carried by a horizontal stirrup 28 attached to the carriage 7 (see FIGURE 2).

A tube ejection plunger 29 (see FIGURE 4) is located in a slot 30 in the fixed jaw, the plunger 29 being attached to the conecting rod 31 of a spring-returned single-acting piston and cylinder 32 mounted on a bracket 33 fixed to the carriage 7. The plunger 29 may be moved by the connecting rod 31 radially inwardly with respect to the inner surface of the tube-engaging portion 16 to eject a rubber tube therefrom.

The carriages 7 are movable towards or away from one another along the slot 6 by means of a pair of similar face cams 34, only one of which is shown (see FIGURE 2), and associated mechanisms. The cams 34 are attached one to each end of a horizontal camshaft 35 disposed beneath the carriages parallel to the slot and rotatable by an electric motor via a reduction gear box, neither of which is illustrated.

Since the cams 34 and their associated mechanisms are similar, one only will be described. A roller cam follower 36 is rotatably attached to an end of a plunger 37 slidably mounted parallel to the camshaft 35 in a guide 38 attached to the lower surface of the steel plate 3. The plunger is in the form of a hollow shaft, closed at the end adjacent to the cam follower 36 and carrying within its interior a resilient member in the form of a coil spring 39 of high stiffness. The end of the coil spring 39 remote from the cam follower 36 is engaged by the head 40 of a bolt 41 attached rigidly to the associated carriage, and thus any movement of the plunger away from the cam 34 is transmitted through the spring 39 to force the carirage along the slot away from the cam. A return spring (not illustrated) is attached at one end to the carriage 7 and at its other end to the machine frame adjacent to the face cam 34 to maintain contact between the cam follower 36 and the cam and thus to cause movement of the carriage towards the cam when the latter rotates into an appropriate position. The clamps 4 and 5 may thus be moved towards or away from one another along the common axis of the gripping members by movement of the carriages, said movement being effected by rotation of the camshaft 35.

Figure 2:
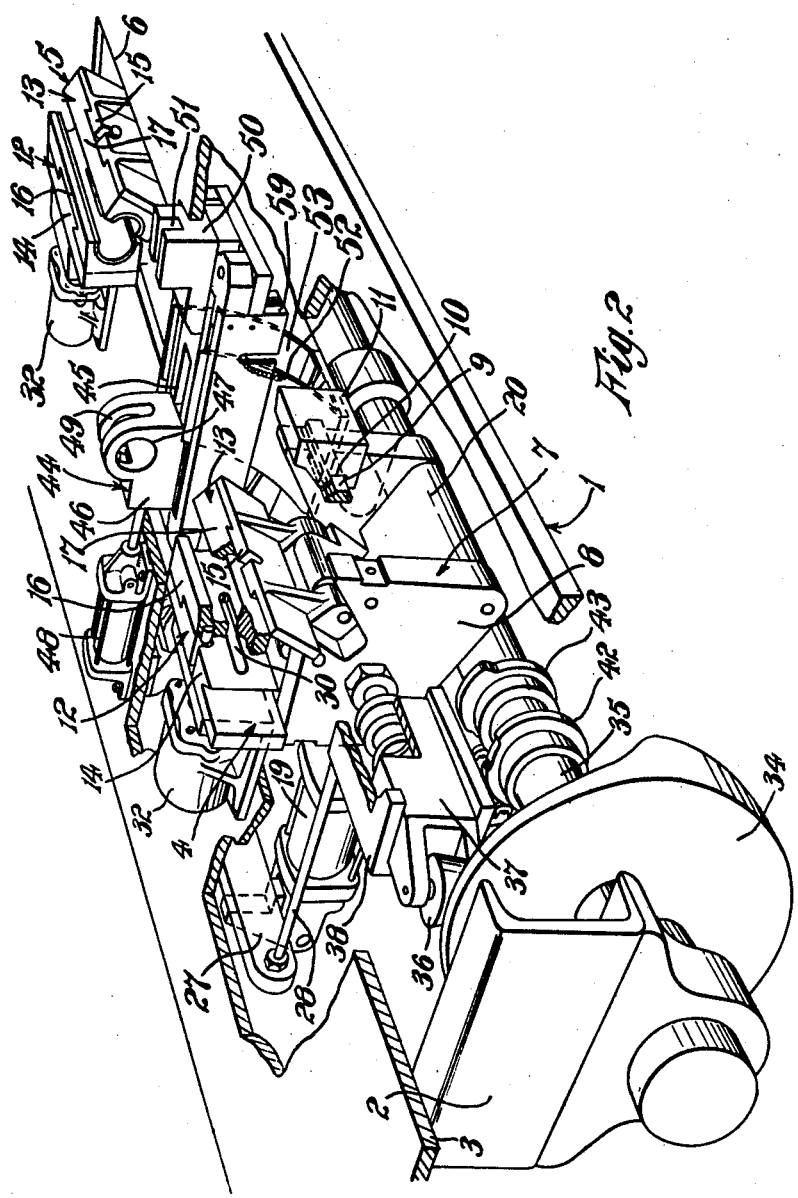
FIGURE 2 is a perspective view, partly cut-away, of part of the apparatus shown in FIGURE 1.

The camshaft 35 is provided with a series of cams, two of which are shown in FIGURE 2 and indicated by reference numerals 42 and 43, for operating, at predetermined times in the sequence of operations of the apparatus, electrical limit switches (not shown) connected to solenoid-operated valves (also not shown) for actuating the pneumatic cylinders and pistons 19 and 32 associated with the carriages 7. A timing mechanism (not shown), the operation of which is initiated by a cam carried on the camshaft, is provided for stopping rotation of the camshaft for a predetermined time at a certain stage of the sequence of operations of the apparatus, for a purpose to be described.

Between the two carriages, a support 44 is mounted in a slide 45 running transversely with respect to the slot 6. The support 44, which serves to hold the free ends of a length of rubber tube (not shown) to be joined into toroidal form, comprises a block 46 with a horizontal bore 47, the axis of the bore being at the same height above the work surface as the common axis of the tube-engaging portions. The ends of the bore 47 are variable in diameter by means of inter-changeable bushes (not shown) which fit within the bore 47 to form sockets to accommodate different sizes of tube. The support 44 is movable along its slide by means of a pneumtaic piston and cylinder 48 mounted on the steel plate 3, to either align the axis of the bore 47 of the support with the common axis of the gripping members on the clamps 4 and 5 or to move the support transversely to a position spaced from the said axis. The pneumatic piston and cylinder 48 is operated in a similar manner to the pistons and cylinders 19 and 32 associated with the carriages 7, i.e., by a cam on the camshaft 35 operating a limit switch connected to a solenoid-operated valve. The support 44 is also provided with a spring clip (not shown) for gripping the outer end of the stem of an inflation valve (not shown) for a curing bag, and a slot 49 is machined in the support perpendicular to said common axis to locate the valve stem therein. A block 50 fixed to the slide 45 is provided to support the outer end of a valve stem one end of which is located in the support, a slot 51 being provided in the block 50 to maintain the valve stem parallel to the slide 45.

Figure 3:
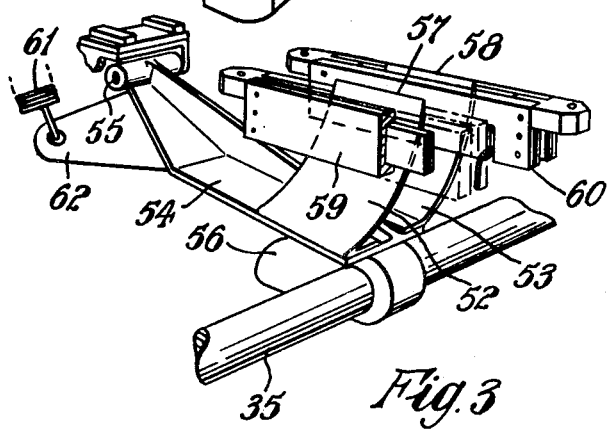
FIGURE 3 is a perspective view of a knife mechanism forming part of the tube-joining apparatus.

A pair of knife blades 52, 53 (see FIGURE 3) is carried on an arm 54 disposed beneath the steel plate 3 and attached to the lower surface of the plate by a pivot 55. The arm 54 is arranged to be perpendicular to the common axis of the gripping members, and the knives 52, 53 are spaced apart at a distance slightly greater than the width of the support 44 considered in a direction parallel with the common axis. A cam 56 is provided on the camshaft to engage the lower surface of the arm 54 and thus to force the two knife blades 52, 53 upwards. The blades 52, 53 are provided, respectively, with sharpened upper edges 57, 58 for cutting the rubber tube. A pair of electric heating elements 59, 60 is positioned under the steel plate 3, one element adjacent to each knife blade, for surrounding and heating the blades 52, 53 before each cutting action. A return spring 61 is fixed between an extension 62 to the arm 54 and the steel plate 3 to pull the arm downwardly to maintain contact between the arm and its associated cam.

The parts of the appartus described above which project above the work surface are protected by a hinged transparent cover 63, and an interlock switch (not shown), actuated by a lug 64 formed on the cover 63, is provided to ensure that the apparatus can only operate when the cover is in the closed position.

The operation of the apparatus described above is as follows:

In the initial state of the apparatus, with the transparent cover open, the clamp jaws 12 and 13 of both clamps 4 and 5 are open, the support 44 is aligned axially with the common axis of the gripping members, the knives 52 and 53 are below the work surface, and the carriages 7 are in their extreme spaced-apart positions.

A length of unvulcanised rubber tube (not shown) is formed by an operator into a loop and the two ends are pushed one into each socket of the support 44. The tube is arranged by the operator so that the portions adjacent to the ends lie over and between the open jaws of their respective clamps 4 and 5.

The operator then inserts a valve stem into the support 44 and the slot 51 of the block 50 and closes the transparent cover 63, thus operating the interlock switch enabling the machine to be started. On operation of a starter switch (not shown), the camshaft 35 begins to rotate. The tube joining operation then proceeds in sequence under the control of the camshaft, without further action by the operator.

First, the pneumatic cylinders and pistons 19 for closing the clamp jaws 12 and 13 are actuated by their cam, the jaws closing and holding the parts of the tube adjacent to the ends in the gripping members formed by the engagement of the tube-engaging portions 16 and 17 of each clamp. The cam 56 then operates to raise the heated blades 52 and 53, cutting through the tube on either side of the support to provide a freshly-trimmed surface on each tube end for subsequent joining. The carriages 7 are then withdrawn slightly towards their respective face cams 34 to allow the knife blades to be lowered without touching the freshly-trimmed ends of the tube.

The knife blades 52 and 53 are then lowered, and the pneumatic cylinder and piston 48 associated with the support 44 is actuated by its cam, limit switch and solenoid valve to draw the support 44 well clear of the common axis of the gripping members. The valve is thus carried by the support 44 to a position mid-way between the tube ends.

Continued rotation of the camshaft brings the cam surfaces on the face cams 34 into operation to move the carriages 7 towards one another. The tube ends are thus pressed firmly together, the inflation valve being trapped between the ends. The rubber of the tube ends, being freshly-cut and therefore tacky, forms a good bond between the ends and around the inflation valve.

At this stage in the sequence of operations, a cam on the camshaft actuates the timer, which stops the rotation of the cam shaft for a dwell period of predetermined length during which the bond between the tube ends is consolidated.

At the end of the dwell period the camshaft again begins to rotate, and a cam on the shaft operates a limit switch to actuate the pneumatic cylinders and pistons 19 for opening the clamp jaws. The tube ejection plungers 29 are then operated by their associated pneumatic cylinders and pistons 32, actuated by a cam and limit switch, to free the joined tube from the clamp jaws. The ejection plungers are then retracted into the fixed jaws.

The sequence of operations is completed by further rotation of the camshaft to allow the carriages 7 to be moved back under the action of their return springs to their original positions. The operator then raises the transparent cover 63, removes the joined tube, and clears the trimmed ends of the tube from the sockets in the support. The apparatus is then ready for use on the next length of tube.

The apparatus described above has the advantages that it involves very little manual work and is quicker and more reliable than conventional methods of tube joining.

Having now described our invention, what we claim is:

1. Apparatus for joining together a pair of unvulcanized rubber tube ends which comprises a pair of gripping members, one for each end, for gripping a rubber tube end, each member comprising concave portions to engage the outer surface of the tube end and support it in open form during a cutting operation and a joining operation, the gripping members being disposed on a common axis and being movable towards and away from one another along said axis, a support for the tube ends positioned between the gripping members and movable transversely relative to the said axis, and a knife for each tube end movable transversely with respect to said axis to sever a portion of said tube held in the support from a portion of said tube held in the associated gripping member.

2. Apparatus according to claim 1 wherein each gripping member comprises a pair of jaws and in which said concave portions are mounted one on each jaw of said pair of jaws, and means for alternatively closing and opening the jaws to move the tube-engaging portions respectively towards and away from one another.

3. Apparatus according to claim 1 comprising a pair of carriages movable towards and away from one another along a path parallel to the common axis of the gripping members one of said pairs of jaws being mounted on each carriage.

4. Apparatus according to claim 2 wherein the tube-engaging portions each have a part-cylindrical surface for engaging and fitting closely to the outer surface of said tube, said gripping member having a complete cylindrical inner tube-engaging surface when said jaws are moved together.

5. Apparatus according to claim 3 wherein each pair of jaws comprises a fixed jaw rigidly attached to its carriage and a movable jaw pivotally mounted on said carriage.

6. Apparatus according to claim 5 comprising a toggle linkage for alternatively closing or opening the jaws of each pair each toggle linkage comprising a first link pivotally attached at one end to the carriage, a second link pivotally attached at one end to the first link and at the other end to the movable jaw and means for moving the links to pivotally move said movable jaw towards or away from said fixed jaw.

7. Apparatus according to claim 6 wherein the means for moving the links comprises a pneumatic piston and cylinder mounted on the carriage.

8. Apparatus according to claim 2 wherein each of the gripping members is provided with a plunger mounted on the carriage and movable, when the jaws are open, to eject a tube from the gripping member.

9. Apparatus according to claim 3 comprising means for slidably mounting said carriages so as to be movable towards and away from one another along a fixed path parallel to the common axis of the gripping members, a pair of rotatable cams being provided, one for each carriage, and a cam follower for each cam connected to its respective carriage to move said carriages along said path.

10. Apparatus according to claim 9 comprising a resilient member connecting said cam followers to their respective carriages.

11. Apparatus according to claim 9 comprising a rotatable shaft disposed parallel to the common axis of the gripping members on which said cams are fixed in spaced-apart positions.

12. Apparatus according to claim 1 wherein means is provided for heating said knife for each tube end.

13. Apparatus according to claim 1 comprising a support for said knives to move the knives transversely with respect to the axis of the gripping members.

14. Apparatus according to claim 13 comprising means for heating said knives and wherein the knife support comprises an arm pivoted to move the knives from said position adjacent to a heating means to a position for severing said tube.

15. Apparatus according to claim 1 wherein the support for the tube ends comprises a pair of cylindrical sockets, one for each tube end.

16. Apparatus according to claim 11 comprising means spaced from said gripping members to heat said knives, a support for said knives comprising an arm pivoted to move said knives from a position adjacent to said heating means to a position to sever said tube ends, a rotatable cam to engage said arm to move said arm about its pivot, said cam being fixed to said shaft.

17. Apparatus according to claim 16 comprising a pneumatic cylinder and piston for moving said support transversely with respect to the common axis of the gripping members.

References Cited in the file of this patent

UNITED STATES PATENTS 2,516,602    Snyder   ---------------- July 25, 1950